(12) United States Patent
Hsiao et al.

(10) Patent No.: US 11,575,905 B2
(45) Date of Patent: Feb. 7, 2023

(54) METHOD AND APPARATUS OF UNIFIED WEIGHT AND MOTION INDEXES DERIVATION FOR GEOMETRIC MERGE MODE IN VIDEO CODING

(71) Applicant: MEDIATEK INC., Hsinchu (TW)

(72) Inventors: Yu-Ling Hsiao, Hsinchu (TW); Chun-Chia Chen, Hsinchu (TW); Chih-Wei Hsu, Hsinchu (TW)

(73) Assignee: HFI INNOVATION INC., Hsinchu (TW)

( * ) Notice: Subject to any disclaimer, the term of this patent is extended or adjusted under 35 U.S.C. 154(b) by 0 days.

(21) Appl. No.: 17/768,622

(22) PCT Filed: Nov. 25, 2020

(86) PCT No.: PCT/CN2020/131508
§ 371 (c)(1),
(2) Date: Apr. 13, 2022

(87) PCT Pub. No.: WO2021/104309
PCT Pub. Date: Jun. 3, 2021

(65) Prior Publication Data
US 2022/0360789 A1 Nov. 10, 2022

Related U.S. Application Data

(60) Provisional application No. 62/940,964, filed on Nov. 27, 2019.

(51) Int. Cl.
*H04N 19/137* (2014.01)
*H04N 19/176* (2014.01)
*H04N 19/59* (2014.01)

(52) U.S. Cl.
CPC ......... *H04N 19/137* (2014.11); *H04N 19/176* (2014.11); *H04N 19/59* (2014.11)

(58) Field of Classification Search
None
See application file for complete search history.

(56) References Cited

U.S. PATENT DOCUMENTS

| | | |
|---|---|---|
| 8,681,855 B2 | 3/2014 | Yin et al. |
| 11,109,057 B2 | 8/2021 | Lin et al. |
| (Continued) | | |

FOREIGN PATENT DOCUMENTS

| | | |
|---|---|---|
| CN | 101822056 A | 9/2010 |
| TW | 201944781 A | 11/2019 |

OTHER PUBLICATIONS

International Search Report and Written Opinion dated Feb. 24, 2021, issued in application No. PCT/CN2020/131508.
(Continued)

*Primary Examiner* — Christopher G Findley
(74) *Attorney, Agent, or Firm* — McClure, Qualey & Rodack, LLP

(57) ABSTRACT

A method and apparatus for video coding are disclosed. According to this method, a current block is received at an encoder side or compressed data comprising the current block is received at a decoder side, where the current block is partitioned into two geometric prediction units. Motion information for the two geometric prediction units is determined. Weighting information for the two geometric prediction units is determined. A motion storage type variable based on the weighting information is determined, where the motion information associated with the current block is stored according to a value of the motion storage type variable. A geometric predictor for the current block is generated by blending two geometric predictors according to the weighting information, where the two geometric predictors are derived for the two geometric prediction units using the motion information associated with the current block.

16 Claims, 5 Drawing Sheets

(56) References Cited

U.S. PATENT DOCUMENTS

| | | |
|---|---|---|
| 2010/0329334 A1 | 12/2010 | Kim et al. |
| 2011/0200097 A1 | 8/2011 | Chen et al. |
| 2017/0188032 A1 | 6/2017 | Rossato et al. |
| 2019/0124356 A1 | 4/2019 | Zhao et al. |
| 2021/0160520 A1* | 5/2021 | Chen ..................... H04N 19/44 |

OTHER PUBLICATIONS

Chinese language Notice of Allowance dated Oct. 29, 2021, issued in application No. TW 109141497.

* cited by examiner

METHOD AND APPARATUS OF UNIFIED WEIGHT AND MOTION INDEXES DERIVATION FOR GEOMETRIC MERGE MODE IN VIDEO CODING

CROSS REFERENCE TO RELATED APPLICATIONS

The present invention claims priority to U.S. Provisional Patent Application, Ser. No. 62/940,964, filed on Nov. 27, 2019. The U.S. Provisional Patent Application is hereby incorporated by reference in its entirety.

FIELD OF THE INVENTION

The present invention relates to prediction for video coding using Geometric Merge mode (GEO). In particular, the present invention discloses techniques to unify the derivation process of weight and motion indexes for GEO.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions.

After the development of HEVC standard, another merging video coding standard, named as Versatile Video Coding (VVC), is being developed under Joint Video Exploration Team (JVET) of ITU-T SG 16 WP 3 and ISO/IEC JTC 1/SC 29/WG 11. Various new coding tools along with some existing coding tools have been evaluated for VVC. Among these coding tools, Geometric Merge mode (GEO) is also proposed for VVC. A brief review of GEO is enclosed as follows.

Geometric Merge Mode (GEO)

Geometric Merge mode is proposed in JVET-P0068 (H. Gao, et al., "CE4: CE4-1.1, CE4-1.2 and CE4-1.14: Geometric Merge Mode (GEO)", ITU-T SG 16 WP 3 and ISO/IEC JTC 1/SC 29/WG 11, 16th Meeting: Geneva, CH, 1-11 Oct. 2019, Document: P0068), which uses the same predictors blending concept as TPM and extends the blending masks up to 140 different modes with 32 angles and 5 distance offsets.

The 140 modes is defined as CE4-1.1 in P0068. To further reduced the complexity, in CE4-1.2 108 modes and 80 modes GEO are tested. In CE4-1.14, a TPM-like simplified motion storage is tested.

FIG. 1A illustrates partition shapes (111-112) for TPM in VTM-6.0 and FIG. 1B illustrates additional shapes (111-119) being proposed for non-rectangular Inter blocks.

Similarly to TPM, the proposed GEO partitioning for Inter is allowed for uni-predicted blocks not smaller than 8×8 in order to have the same memory bandwidth usage as the bi-predicted blocks at the decoder side. Motion vector prediction is performed for GEO partitions individually. Also, the blending between two predictions is applied on inner boundary.

The split boundary of geometric Merge mode is descripted by angle $\varphi_i$ and distance offset $\rho_i$ as shown in FIG. 2. Angle $\varphi_i$ represents a quantized angle between 0 and 360 degrees and distance offset $\rho_i$ represents a quantized offset of the largest distance $\rho_{max}$. In addition, the split directions overlapped with binary tree splits and TPM splits are excluded.

Decoding Process for GEOInter Blocks

Texts of decoding process for GEO Inter blocks (i.e., wedge Inter blocks) are proposed in an attachment to JVET-P0884 (H. Gao, et al., "Simplified GEO without multiplication and minimum blending mask storage (harmonization of JVET-P0107, JVET-P0264 and JVET-P0304)", ITU-T SG 16 WP 3 and ISO/IEC JTC 1/SC 29/WG 11, 16th Meeting: Geneva, CH, 1-11 Oct. 2019, Document: JVET-P0884). The texts of decoding process for GEO Inter blocks modified over JVET-O2001 as disclosed in an attachment to JVET-P0884 are listed below in order to set a base line practice of conventional derivation of weight index and motion index. The section, clause, table and drawing numberings are kept the same as the modified JVET-O2001.

8.5.7 Decoding Process for Wedge Inter Blocks
8.5.7.1 General
This process is invoked when decoding a coding unit with wedge_merge_mode[xCb][yCb] equal to 1.
Inputs to this process are:—
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  the luma motion vectors in 1/16 fractional-sample accuracy mvA and mvB,
  the chroma motion vectors mvCA and mvCB,
  the reference indices refIdxA and refIdxB,
  the prediction list flags predListFlagA and predListFlagB.
Outputs of this process are:
  an (cbWidth)×(cbHeight) array predSamplesL of luma prediction samples,
  an (cbWidth/Sub WidthC)×(cbHeight/SubHeightC) array predSamplesCb of chroma prediction samples for the component Cb,
  an (cbWidth/Sub WidthC)×(cbHeight/SubHeightC) array predSamplesCr of chroma prediction samples for the component Cr.

Let predSamplesLAL and predSamplesLBL be (cbWidth)×(cbHeight) arrays of predicted luma sample values and, predSamplesLACb, predSamplesLBCb, predSamplesLACr and predSamplesLBCr be (cbWidth/Sub WidthC)×(cbHeight/SubHeightC) arrays of predicted chroma sample values.

The predSamplesL, predSamplesCb and predSamplesCr are derived by the following ordered steps:
  1. For N being each of A and B, the following applies:
    The reference picture consisting of an ordered two-dimensional array refPicLNL of luma samples and two ordered two-dimensional arrays refPicLNCb and refPicLNCr of chroma samples is derived by invoking the process specified in clause 8.5.6.2 with X set equal to predListFlagN andrefIdxX set equal to refIdxN as input.

The array predSamplesLNL is derived by invoking the fractional sample interpolation process specified in clause 8.5.6.3 with the luma location (xCb, yCb), the lumacoding block widthsbWidth set equal tocbWidth, the lumacoding block heightsbHeight set equal tocbHeight, the motion vector offset mvOffset set equal to (0, 0), the motion vector mvLX set equal to mvN and the reference array refPicLXL set equal torefPicLNL, the variable bdofFlag set equal to FALSE, and the variable cIdx is set equal to 0 as inputs.

The array predSamplesLNCb is derived by invoking the fractional sample interpolation process specified in clause 8.5.6.3 with the luma location (xCb, yCb), the coding block widthsbWidth set equal tocbWidth/SubWidthC, the coding block heightsbHeight set equal tocbHeight/SubHeightC, the motion vector offset mvOffset set equal to (0, 0), the motion vector mvLX set equal to mvCN, and the reference array refPicLXCb set equal to refPicLNCb, the variable bdofFlag set equal to FALSE, and the variable cIdx is set equal to 1 as inputs.

The array predSamplesLNCr is derived by invoking the fractional sample interpolation process specified in clause 8.5.6.3 with the luma location (xCb, yCb), the coding block widthsbWidth set equal tocbWidth/SubWidthC, the coding block heightsbHeight set equal tocbHeight/SubHeightC, the motion vector offset mvOffset set equal to (0, 0), the motion vector mvLX set equal to mvCN, and the reference array refPicLXCr set equal to refPicLNCr, the variable bdofFlag set equal to FALSE, and the variable cIdx is set equal to 2 as inputs.

2. The partition angle and distance of the wedge merge mode angleIdx and distanceIdex are set according to the value of wedge partition idx[xCb][yCb] as specified in Table 8-10

3. The prediction samples inside the current lumacoding block, predSamplesL[xL][yL] with xL=0..cbWidth-1 and yL=0..cbHeight-1, are derived by invoking the weighted sample prediction process for wedge merge mode specified in clause 8.5.7.2 with the coding block widthnCbW set equal tocbWidth, the coding block heightnCbH set equal tocbHeight, the sample arrays predSamplesLAL and predSamplesLBL, and the variables angleIdx and distanceIdx, and cIdx equal to 0 as inputs.

4. The prediction samples inside the current chroma component Cbcoding block, predSamplesCb[xC][yC] with xC=0..cbWidth/SubWidthC-1 and yC=0..cbHeight/SubHeightC-1, are derived by invoking the weighted sample prediction process for wedge merge mode specified in clause 8.5.7.2 with the coding block width nCbW set equal to cbWidth/SubWidthC, the coding block height nCbH set equal to cbHeight/SubHeightC, the sample arrays predSamplesLACb and predSamplesLBCb, and the variables angleIdx and distanceIdx, and cIdx equal to 1 as inputs.

5. The prediction samples inside the current chroma component Cr coding block, predSamplesCr[xC][yC] with xC=0..cbWidth/SubWidthC-1 and yC=0..cbHeight/SubHeightC-1, are derived by invoking the weighted sample prediction process for wedge merge mode specified in clause 8.5.7.2 with the coding block width nCbW set equal to cbWidth/SubWidthC, the coding block height nCbH set equal to cbHeight/SubHeightC, the sample arrays predSamplesLACr and predSamplesLBCr, and the variables angleIdx and distanceIdx, and cIdx equal to 2 as inputs.

6. The motion vector storing process for merge wedge mode specified in clause 8.5.7.3 is invoked with the luma coding block location (xCb, yCb), the luma coding block width cbWidth, the luma coding block height cbHeight, the partition direction angleIdx and distanceIdx, the luma motion vectors mvA and mvB, the reference indices refIdxA and refIdxB, and the prediction list flags predListFlagA and predListFlagB as inputs.

TABLE 8-10

Specification of the angleIdx and distanceIdx values based on the wedge_partition_idx value.

| wedge_partition_idx | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| angleIdx | 0 | 0 | 0 | 1 | 1 | 1 | 1 | 2 | 2 | 2 | 2 | 3 | 3 | 3 | 3 | 4 | 4 | 4 |
| distanceIdx | 1 | 2 | 3 | 0 | 1 | 2 | 3 | 0 | 1 | 2 | 3 | 0 | 1 | 2 | 3 | 0 | 1 | 2 |

| wedge_partition_idx | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|
| angleIdx | 4 | 5 | 5 | 5 | 5 | 6 | 6 | 6 | 7 | 7 | 7 | 7 | 8 | 8 | 8 | 8 | 9 | 9 |
| distanceIdx | 3 | 0 | 1 | 2 | 3 | 1 | 2 | 3 | 0 | 1 | 2 | 3 | 0 | 1 | 2 | 3 | 0 | 1 |

| wedge_partition_idx | 36 | 37 | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|---|---|
| angleIdx | 9 | 9 | 10 | 10 | 10 | 10 | 11 | 11 | 11 | 11 | 12 | 12 | 12 | 13 | 13 | 13 | 14 | 14 |
| distanceIdx | 2 | 3 | 0 | 1 | 2 | 3 | 0 | 1 | 2 | 3 | 1 | 2 | 3 | 1 | 2 | 3 | 1 | 2 |

| wedge_partition_idx | 54 | 55 | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|---|---|
| angleIdx | 14 | 15 | 15 | 15 | 16 | 16 | 16 | 17 | 17 | 17 | 18 | 18 | 18 | 19 | 19 | 19 | 20 | 20 |
| distanceIdx | 3 | 1 | 2 | 3 | 1 | 2 | 3 | 1 | 2 | 3 | 1 | 2 | 3 | 1 | 2 | 3 | 1 | 2 |

TABLE 8-10-continued

Specification of the angleIdx and distanceIdx values based on the wedge_partition_idx value.

| | wedge _partition_idx | | | | | | | | | |
|---|---|---|---|---|---|---|---|---|---|---|
| | 72 | 73 | 74 | 75 | 76 | 77 | 78 | 79 | 80 | 81 |
| angleIdx | 20 | 21 | 21 | 21 | 22 | 22 | 22 | 23 | 23 | 23 |
| distanceIdx | 3 | 1 | 2 | 3 | 1 | 2 | 3 | 1 | 2 | 3 |

8.5.7.2 Weighted Sample Prediction Process for Wedge Merge Mode

Inputs to this process are:

two variables nCbW and nCbH specifying the width and the height of the current coding block, two (nCbW)×(nCbH) arrays predSamplesLA and pred-SamplesLB, a variable angleIdx specifying the angle index of the wedge partition, a variable distanceIdxspecizing the distance idx of the wedge partition, a variable cIdx specifying colour component index.

Output of this process is the (nCbW)×(nCbH) array pbSamples of prediction sample values.

The variable bitDepth is derived as follows:

If cIdx is equal to 0, bitDepth is set equal to BitDepthY.

If cIdx is equal to 0, nW and nH are set equal to nCbW and nCbH respectively, otherwise (cIdx is not equal to 0) nW and nH are set equal to nCbW×SubWidthC and nCbH×SubHeightC respectively.

If cIdx is equal to 0, subW and subH are both set 1, otherwise (cIdx is not equal to 0) subW and subH are set equal to SubWidthC and SubHeightC respectively.

Otherwise, bitDepth is set equal to BitDepthC.

Variables shift1 and offset1 are derived as follows:

The variable shift1 is set equal to Max(5, 17—bitDepth).

The variable offset1 is set equal to 1<<(shift1−1).

The values of the following variables are set:

hwRatio is set to nH/nW displacementX is set to angleIdx displacementY is set to (displacementX+6)%24

If angleIdx>=10 && angleIdx<=20, PART1 and PART2 are set equal to A and B respectively, otherwise PART1 and PART2 are set equal to B and A respectively.

rho is set to the following value using the look-up tables denoted as Dis, specified in Table 8-12:

rho=(Dis[displacementX]<<8)+(Dis[displacement-Y]<<8)

If one of the following conditions is true, variable shift-Hor is set equal to 0:

angleIdx % 12 is equal to 6 angleIdx % 12 is not equal to 0 and hwRatio>1

Otherwise, shiftHor is set equal to 1.

If shiftHor is equal to 0, offsetX and offsetY are derived as follows:

offsetX=(256−nW)>>1 offsetY=(256−nH)>>1+angleIdx<12?
(distanceIdx*nH)>>3:−((distanceIdx*nH)>>3)

Otherwise, if shiftHor is equal to 1, offsetX and offsetY are derived as follows:

offsetX=(256−nW)>>1+angleIdx<12?
(distanceIdx*nW)>>3:−((distanceIdx*nW)>>3)

offsetY=(256−nH)>>1

The prediction sample valuespbSamples[x][y] with x=0..nCbW−1 and y=0..nCbH−1 is set according the following ordered steps:

The variable weightIdx and weightIdxAbs are calculated using the look-up table Table 8-12 as follows:

weightIdx=(((x*subW+offsetX)<<1)+1)*Dis[displacementX]+(((y*subH+offsetY)<<1)+1))*Dis[displacementY]−rho.

weightIdxAbs=Clip3(0, 26, abs(weightIdx)).

The value of sampleWeight is derived according to according to Table 8-13 as follows:
sampleWeight=weightIdx<=0?WedgeFilter[weightIdxAbs]:
8—WedgeFilter[weightIdxAbs]

NOTE—The value of sample sampleWeightL[x][y] can also be derived from sampleWeightL[x−shiftX][y−shiftY]. If the angleIdx is larger than 4 and smaller than 12, or angleIdx is larger than 20 and smaller than 24, shiftX is the tangent of the split angle and shiftY is 1, otherwise shiftX is 1 of the split angle and shiftY is cotangent of the split angle. If tangent (resp. cotangent) value is infinity, shiftX is 1 (resp. 0) or shift Y is 0 (reps. 1).

The prediction sample value pbSamples[x][y] is derived as follows:

pbSamples[x][y]=Clip3(0,(1<<bitDepth)−1,(pred-SamplesLPART1[x][y]*(8−sampleWeight)+pred-SamplesLPART2[x][y]*sampleWeight+offset1)>>shift1)

TABLE 8-12

Look-up table Dis for derivation of wedgemetric partitioning distance.

| | idx | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Dis[idx] | 8 | 8 | 8 | 8 | 4 | 2 | 0 | −2 | −4 | −8 | −8 | −8 |

| | idx | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| Dis[idx] | −8 | −8 | −8 | −8 | −4 | −2 | 0 | 2 | 4 | 8 | 8 | 8 |

TABLE 8-13

Filter weight look-up table WedgeFilter for derivation of wedge partitioning filter weights.

| | idx | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| WedgeFilter[idx] | 4 | 4 | 4 | 4 | 5 | 5 | 5 | 5 | 5 | 5 | 5 | 6 | 6 | 6 |

| | idx | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| WedgeFilter[idx] | 6 | 6 | 6 | 6 | 7 | 7 | 7 | 7 | 7 | 7 | 7 | 7 | 8 |

8.5.7.3 Motion Vector Storing Process for Wedge Merge Mode

This process is invoked when decoding a coding unit with MergeWedgeFlag[xCb][yCb] equal to 1.

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples,
- the luma motion vectors in 1/16 fractional-sample accuracymvA and mvB,
- the reference indices refIdxA and refIdxB,
- the prediction list flags predListFlagA and predListFlagB.

The variables numSbX and numSbY specifying the number of 4×4 blocks in the current coding block in horizontal and vertical direction are set equal to numSbX=cbWidth>>2 and numSbY=cbHeight>>2.

The value of the following variables are set:
displacementX is set to angleIdx, displacementY is set to (displacementX+6)%24−
hwRatio is set equal to nCbH/nCbW If one of the following conditons is true, variable shiftHor is set equal to 0:
  angleIdx % 12 is equal to 8
  angleIdx % 12 is not equal to 0 and hwRatio>1
Otherwise, shiftHor is set equal to 1.
partIdx is set to angleIdx>=10 && angleIdx<=20?1:0.

If shiftHor is equal to 0, offsetX and offsetY are derived as follows:—
  offsetX=(64−numSbX)>>1
  offsetY=(64−numSbY)>>1+angleIdx<12?
    (distanceIdx*nCbH)>>5: −((distanceIdx*nCbH)>>5)

Otherwise, if shiftHor is equal to 1, offsetX and offsetY are derived as follows:
  offsetX=(64−numSbX)>>1+angleIdx<12?
    (distanceIdx*nCbW)>>5: −((distanceIdx*nCbW)>>5)
  offsetY=(64−numSbY)>>1

The value of the variable rho is derived according to the equation below and according to the D is lookup table specified in Table 8-12:
  rho=(Dis[displacementX]<<8)+(Dis[displacementY]<<8).

motionOffset is set equal to the following value using the look-up tables denoted as Dis, specified in Table 8-11 and Table 8-12:
  motionOffset=3*Dis[displacementX]+3*Dis[displacementY].

For each 4×4 subblock at subblock index (xSbIdx, ySbIdx) with xSbIdx=0..numSbX−1, and ySbIdx=0..numSbY−1, the following applies:
The variable motionIdx is calculated using the look-up table Table 8-12 as following:
  motionIdx=(((xSbIdx+offsetX)<<3)+1)*Dis[displacementX]+(((xSbIdx+offsetY<<3)+1))*Dis[displacementY]−rho+motionOffset The variable sType is derived as follows:
  sType=abs(motionIdx)<32?2:motionIdx<=0?partIdx: 1−partIdx Depending on the value of sType, the following assignments are made:—
If sType is equal to 0, the following applies:
  predFlagL0=(predListFlagA==0)?1:0 (8-853)
  predFlagL1=(predListFlagA==0)?0:1 (8-854)
  refIdxL0=(predListFlagA==0)?refIdxA: −1 (8-855)
  refIdxL1=(predListFlagA==0)?−1: refIdxA (8-856)
  mvL0[0]=(predListFlagA==0)?mvA[0]: 0 (8-857)
  mvL0[1]=(predListFlagA==0)?mvA[1]: 0 (8-858)
  mvL1[0]=(predListFlagA==0)?0: mvA[0] (8-859)
  mvL1[1]=(predListFlagA==0)?0: mvA[1] (8-860)
Otherwise, if sType is equal to 1 or (sType is equal to 2 and predListFlagA+predListFlagB is not equal to 1), the following applies:
  predFlagL0=(predListFlagB==0)?1:0 (8-861)
  predFlagL1=(predListFlagB==0)?0:1 (8-862)
  refIdxL0=(predListFlagB==0)?refIdxB: −1 (8-863)
  refIdxL1=(predListFlagB==0)?−1: refIdxB (8-864)
  mvL0[0]=(predListFlagB==0)?mvB[0]: 0 (8-865)
  mvL0[1]=(predListFlagB==0)?mvB[1]: 0 (8-866)
  mvL1[0]=(predListFlagB==0)?0: mvB[0] (8-867)
  mvL1[1]=(predListFlagB==0)?0: mvB[1] (8-868)
Otherwise (sType is equal to 2 and predListFlagA+predListFlagB is equal to 1), the following applies:
  predFlagL0=1 (8-869)
  predFlagL1=1 (8-870)
  refIdxL0=(predListFlagA==0)?refIdxA: refIdxB (8-871)
  refIdxL1=(predListFlagA==0)?refIdxB: refIdxA (8-872)
  mvL0[0]=(predListFlagA==0)?mvA[0]: mvB[0] (8-873)
  mvL0[1]=(predListFlagA==0)?mvA[1]: mvB[1] (8-874)
  mvL1[0]=(predListFlagA==0)?mvB[0]: mvA[0] (8-875)
  mvL1[1]=(predListFlagA==0)?mvB[1]: mvA[1] (8-876)

The following assignments are made for x=0..3 and y=0..3:
  MvL0[(xSbIdx<<2)+x][(ySbIdx<<2)+y]=mvL0 (8-877)
  MvL1[(xSbIdx<<2)+x][(ySbIdx<<2)+y]=mvL1 (8-878)
  RefIdxL0[(xSbIdx<<2)+x][(ySbIdx<<2)+y]=refIdxL0 (8-879)
  RedIdxL1[(xSbIdx<<2)+x][(ySbIdx<<2)+y]=refIdxL1 (8-880)
  PredFlagL0[(xSbIdx<<2)+x][(ySbIdx<<2)+y]=predFlagL0 (8-881)
  PredFlagL1[(xSbIdx<<2)+x][(ySbIdx<<2)+y]=predFlagL1 (8-882)

In the following disclosure, the syntax design disclosed above will be used as references to illustrate the present invention.

BRIEF SUMMARY OF THE INVENTION

A method and apparatus for video coding are disclosed. According to this method, a current block is received at an encoder side or compressed data comprising the current block is received at a decoder side, wherein the current block is partitioned into two geometric prediction units. Motion information for the two geometric prediction units is determined. Weighting information for the two geometric prediction units is determined. A motion storage type variable based on the weighting information is determined, wherein the motion information associated with the current block is stored according to a value of the motion storage type variable. A geometric predictor for the current block is generated by blending two geometric predictors according to the weighting information, wherein the two geometric predictors are derived for the two geometric prediction units using the motion information associated with the current block.

In one embodiment, the motion storage type variable is determined based on luma weight index, wherein the luma weight index indicates a target set of weighting factors used for said blending the two geometric predictors. For example, the motion storage type variable can be determined based on the target set of weighting factors at a subsampling location of a sub-block grid. In another example, the motion storage type variable is determined based on the target set of weighting factors at any subsampling location of a 4×4 grid.

In one embodiment, the motion storage type variable is determined based on luma sample weights. For example, the motion storage type variable can be determined based on the luma sample weights at a subsampling location of a sub-block grid. In another example, the motion storage type variable can be determined based on the luma sample weights at any subsampling location of a 4×4 grid.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In order to improve coding efficiency, it is proposed to unify weight index and motion index derivation of geometric merge mode for Skip, Merge, Direct, Inter modes, and/or IBC modes in this invention.

Figure 1A:
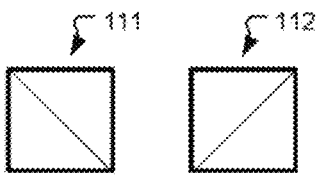
FIG. 1A illustrates partition shapes for the triangular prediction mode (TPM) as disclosed in VTM-6.0.
Figure 1B:
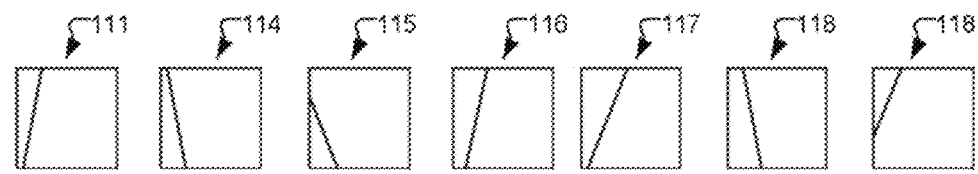
FIG. 1B illustrates additional shapes being discussed for non-rectangular Inter blocks.
Figure 2:
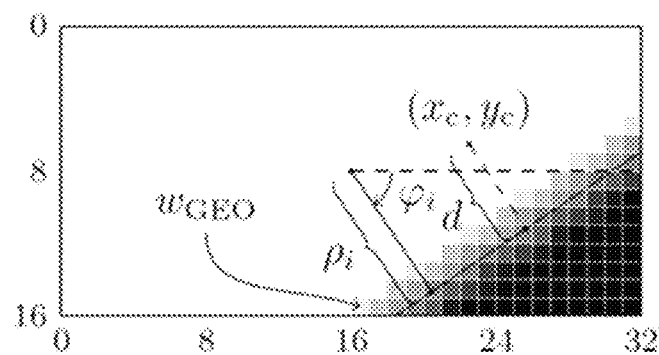
FIG. 2 illustrates the split boundary of geometric Merge mode that is descripted by angle $\varphi_i$ and distance offset $\rho_i$.
Figure 3:
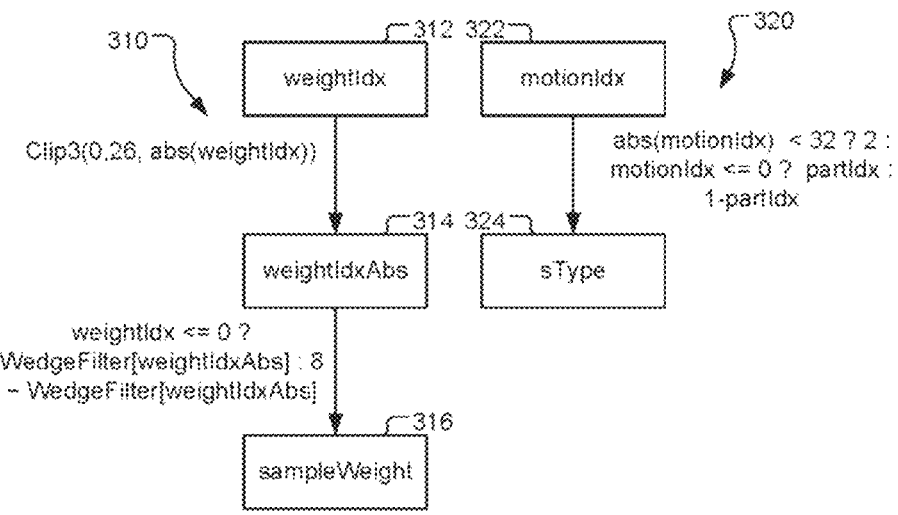
FIG. 3 illustrates one example of conventional derivation of sampleWeight and sType of GEO.

FIG. 3 illustrates one example of conventional derivation of sampleWeight and sType of GEO. However, there may be various other ways to implement the conventional derivation of sampleWeight and sType of GEO. For other different approaches, weightIdx-Abs and sampleWeight derivation may be different from those in FIG. 3. Nevertheless, the main concept may be the same. In other words, the weightIdx is computed from the geometric pixel-based formula, and weightIdxAbs is derived from the clipped value of weightIdx. Then, the sampleWeight is obtained from looking-up one filter-based mapping table. On the other hand, sType is defined as an internal variable to determine the modes of sub-block based motion storage. sType equal to 0 indicates storing MV0 (i.e., motion vector associated with partition 0), 1 indicates storing MV1 (i.e., motion vector associated with partition 1) and 2 indicates storing derived MV.

Figure 4:
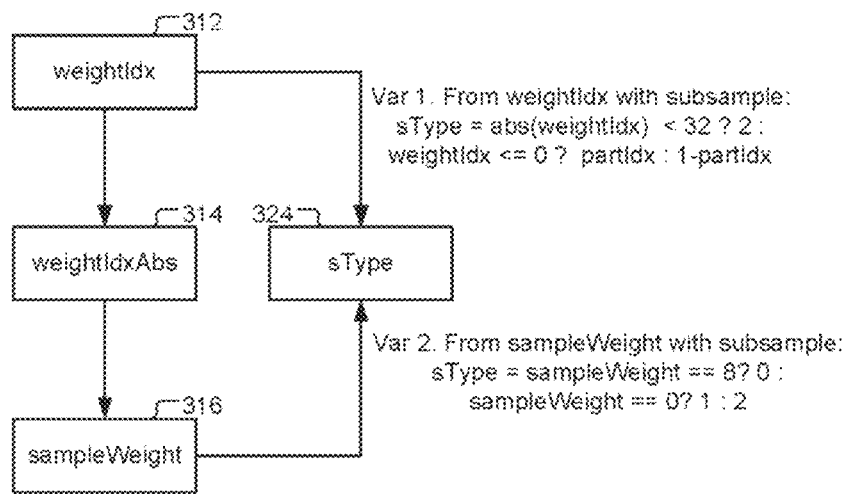
FIG. 4 illustrates one example of unified weight and sType derivation according to one embodiment of the present invention.

In order to simplify the derivation process, in one embodiment according to the present invention, a unified derivation is disclosed, where sType is derived from lumaweightIdx with subsampling as shown in FIG. 4 denoted as variation 1 (Var 1). According to this embodiment, sType is derived according to the following equation:

sType=abs(weightIdx)<32?2:weightIdx<=0?partIdx: 1−partIdx.

As shown in the above equation, if abs(weightIdx) is smaller than 32, sType is equal to 2. Otherwise (i.e., abs (weightIdx)>=32), sType is equal to partIdxif weightIdx is smaller than or equal to 0; and otherwise (i.e., weightIdx>0), sType is equal to (1-partIdx). According to GEO decoding process in the attachment to JVET-P0884, partIdx is a variable corresponding to a partition index.

In another embodiment, sType is derived from lumasampleWeight with subsampling as shown in FIG. 4 denoted as variation 2 (Var 2). According to this embodiment, sType is derived according to the following equation:

sType=sampleWeight==8?0:sampleWeight==0?1:2.

As shown in the above equation, if sampleWeight is equal to 8, sType is equal to 0. Otherwise (i.e., sampleWeight 8), sType is equal to 1 if sampleWeight is equal to 0; and otherwise (i.e., sampleWeight 0), sType is equal to 2.

In the above embodiment, sType is derived from luma-weightIdx with subsampling according to Var 1. While weightIdx is compared with a value of 32, other criterion can be used. For example, weightIdx can be compared with other values. In another embodiment, sType is derived as follows:

sType=abs(weightIdx)<N?2: weightIdx<=0?partIdx: 1-partIdx, where N is one fixed positive integer.

In yet another embodiment, if (weightIdx<−P), sType=partIdx, else if (weightIx>=−P &&weightIdx<Q), sTyp=2, else sType=(1-partIdx), in which P and Q are fixed positive integers.

In the above embodiment, for sType that is derived from lumasampleWeight with subsampling, when sampleWeight is between minimum sampleWeight value and maximum sampleWeight value, the sType is set to 2, which means that the derived motion will be stored. When the sampleWeight equal to minimum sampleWeight value or maximum sampleWeight value, the sType is set to 0 or 1, which means the uni-prediction motion will be stored.

Figure 5:
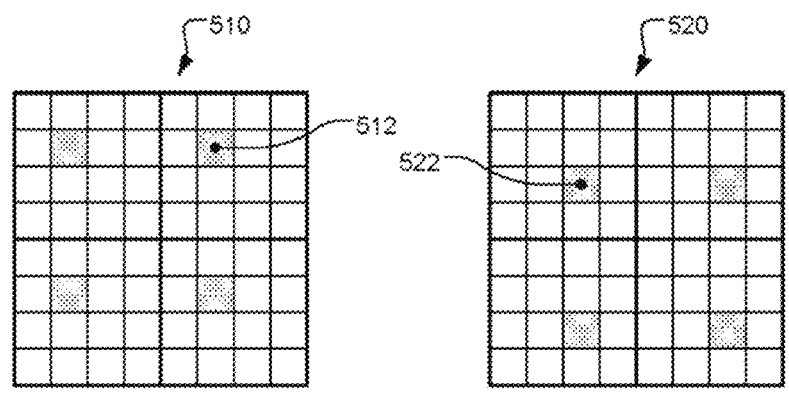
FIG. 5 illustrates one example of unified weight and sType derivation with subsampling based as 4×4 sub-block.

In the above embodiment, the subsampling is 4×4-based as shown in FIG. 5. In the above embodiment, the subsampling location can be any position in a 4×4 grid as shown in FIG. 5. For example, subsampling at location (1,1) in a 4×4 grid is shown as arrangement 510 in FIG. 5 or location (2,2) position in a 4×4 grid is shown as arrangement 520 in FIG. 5, where a gray pixel (512 or 522) indicates the subsampling location.

The foregoing proposed method can be implemented in encoders and/or decoders. For example, the proposed method can be implemented in anInter prediction module and/or Intra block copy prediction module of an encoder, and/or anInter prediction module (and/or Intra block copy prediction module) of a decoder.

Figure 6:
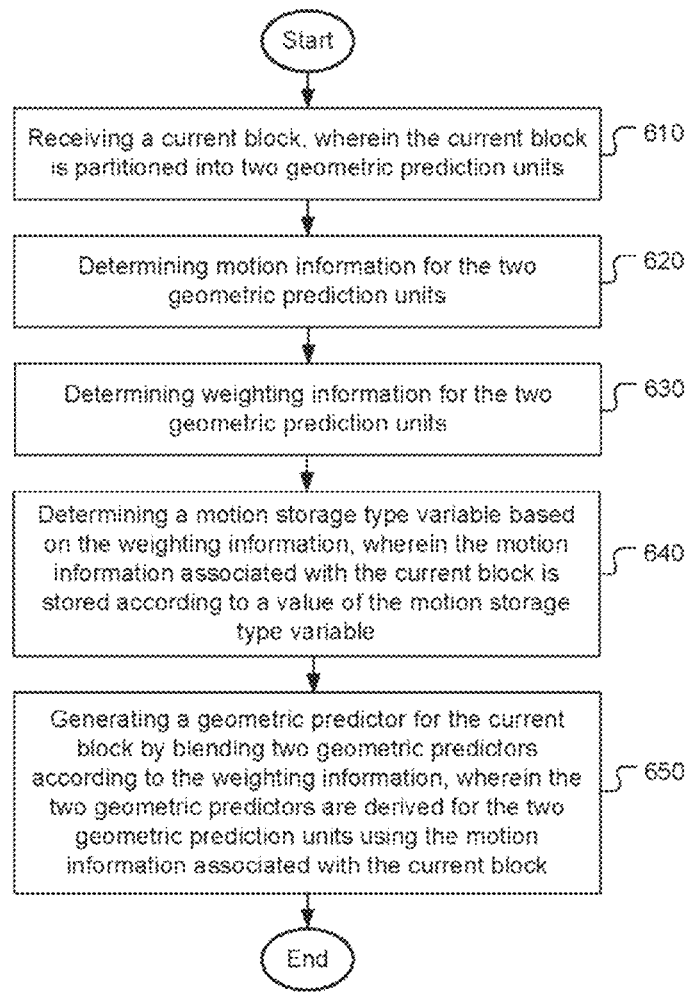
FIG. 6 illustrates a flowchart of an exemplary prediction for video encoding according to an embodiment of the present invention, where sType is derived using motion information.

FIG. 6 illustrates a flowchart of an exemplary prediction for video encoding according to an embodiment of the present invention, where sType is derived using motion information. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a current block comprising one luma block and one or more chroma blocks is received in step 610, wherein the current block is partitioned into two geometric prediction units. Motion information for the two geometric prediction units is determined in step 620. Weighting information for the two geometric prediction units is determined in step 630. A motion storage type variable based on the weighting information is determined in step 640, wherein the motion information associated with the current block is stored according to a value of the motion storage type variable. A geometric predictor for the current block is generated by blending two geometric predictors according to the weighting information in step 650, wherein the two geometric predictors are derived for the two geometric prediction units using the motion information associated with the current block.

Figure 7:
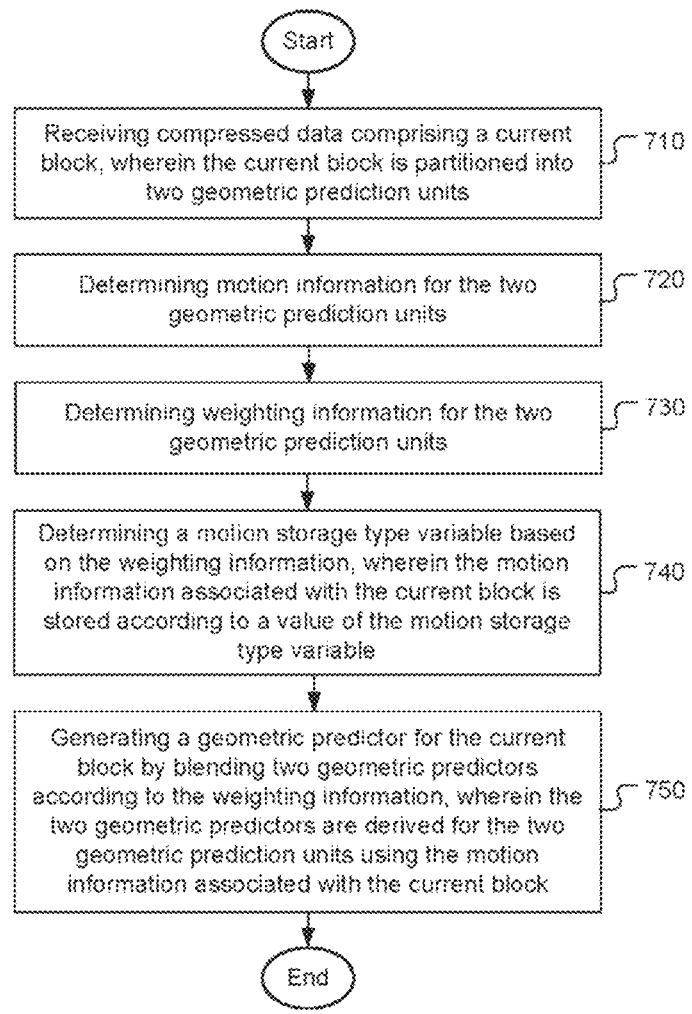
FIG. 7 illustrates a flowchart of an exemplary prediction for video decoding according to an embodiment of the present invention, where sType is derived using motion information.

FIG. 7 illustrates a flowchart of an exemplary prediction for video decoding according to an embodiment of the present invention, where sType is derived using motion information. According to this method, compressed data comprising a current block are received in step 710, wherein the current block is partitioned into two geometric prediction units. Motion information for the two geometric prediction units is determined in step 720. Weighting information for the two geometric prediction units is determined in step 730. A motion storage type variable based on the weighting information is determined in step 740, wherein the motion information associated with the current block is stored according to a value of the motion storage type variable. A geometric predictor for the current block is generated by blending two geometric predictors according to the weighting information in step 750, wherein the two geometric predictors are derived for the two geometric prediction units using the motion information associated with the current block.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding, the method comprising:
   receiving a current block, wherein the current block is partitioned into two geometric prediction units;
   determining motion information for the two geometric prediction units;
   determining weighting information for the two geometric prediction units;
   determining a motion storage type variable based on the weighting information, wherein the motion information associated with the current block is stored according to a value of the motion storage type variable; and
   generating a geometric predictor for the current block by blending two geometric predictors according to the weighting information, wherein the two geometric predictors are derived for the two geometric prediction units using the motion information associated with the current block.

2. The method of claim 1, wherein the motion storage type variable is determined based on luma weight index, wherein the luma weight index indicates a target set of weighting factors used for said blending the two geometric predictors.

3. The method of claim 2, wherein the motion storage type variable is determined based on the target set of weighting factors at a subsampling location of a sub-block grid.

4. The method of claim 2, wherein the motion storage type variable is determined based on the target set of weighting factors at any subsampling location of a 4×4 grid.

5. The method of claim 1, wherein the motion storage type variable is determined based on luma sample weights.

6. The method of claim 5, wherein the motion storage type variable is determined based on the luma sample weights at a subsampling location of a sub-block grid.

7. The method of claim 5, wherein the motion storage type variable is determined based on the luma sample weights at any subsampling location of a 4×4 grid.

8. An apparatus of video encoding, the apparatus comprising one or more electronic circuits or processors arranged to:
    receive a current block, wherein the current block is partitioned into two geometric prediction units;
    determine motion information for the two geometric prediction units;
    determine weighting information for the two geometric prediction units;
    determine a motion storage type variable based on the weighting information, wherein the motion information associated with the current block is stored according to a value of the motion storage type variable; and
    generate a geometric predictor for the current block by blending two geometric predictors according to the weighting information, wherein the two geometric predictors are derived for the two geometric prediction units using the motion information associated with the current block.

9. A method of video decoding, the method comprising:
    receiving compressed data comprising a current block, wherein the current block is partitioned into two geometric prediction units;
    determining motion information for the two geometric prediction units;
    determining weighting information for the two geometric prediction units;
    determining a motion storage type variable based on the weighting information, wherein the motion information associated with the current block is stored according to a value of the motion storage type variable; and
    generating a geometric predictor for the current block by blending two geometric predictors according to the weighting information, wherein the two geometric predictors are derived for the two geometric prediction units using the motion information associated with the current block.

10. The method of claim 9, wherein the motion storage type variable is determined based on luma weight index, wherein the luma weight index indicates a target set of weighting factors used for said blending the two geometric predictors.

11. The method of claim 10, wherein the motion storage type variable is determined based on the target set of weighting factors at a subsampling location of a sub-block grid.

12. The method of claim 10, wherein the motion storage type variable is determined based on the target set of weighting factors at a subsampling location of a 4×4 grid.

13. The method of claim 10, wherein the motion storage type variable is determined based on luma sample weights.

14. The method of claim 13, wherein the motion storage type variable is determined based on the luma sample weights at a subsampling location of a sub-block grid.

15. The method of claim 13, wherein the motion storage type variable is determined based on the luma sample weights at a subsampling location of a 4×4 grid.

16. An apparatus of video decoding, the apparatus comprising one or more electronic circuits or processors arranged to:
    receive compressed data comprising a current block, wherein the current block is partitioned into two geometric prediction units;
    determine motion information for the two geometric prediction units;
    determine weighting information for the two geometric prediction units;
    determine a motion storage type variable based on the weighting information, wherein the motion information associated with the current block is stored according to a value of the motion storage type variable; and
    generate a geometric predictor for the current block by blending two geometric predictors according to the weighting information, wherein the two geometric predictors are derived for the two geometric prediction units using the motion information associated with the current block.

* * * * *